May 28, 1929.  W. B. WESCOTT  1,714,995
TREAD STOCK
Filed Oct. 28, 1925    2 Sheets-Sheet 1

Inventor
WILLIAM B. WESCOTT,
O. P. McElroy
his Attorney

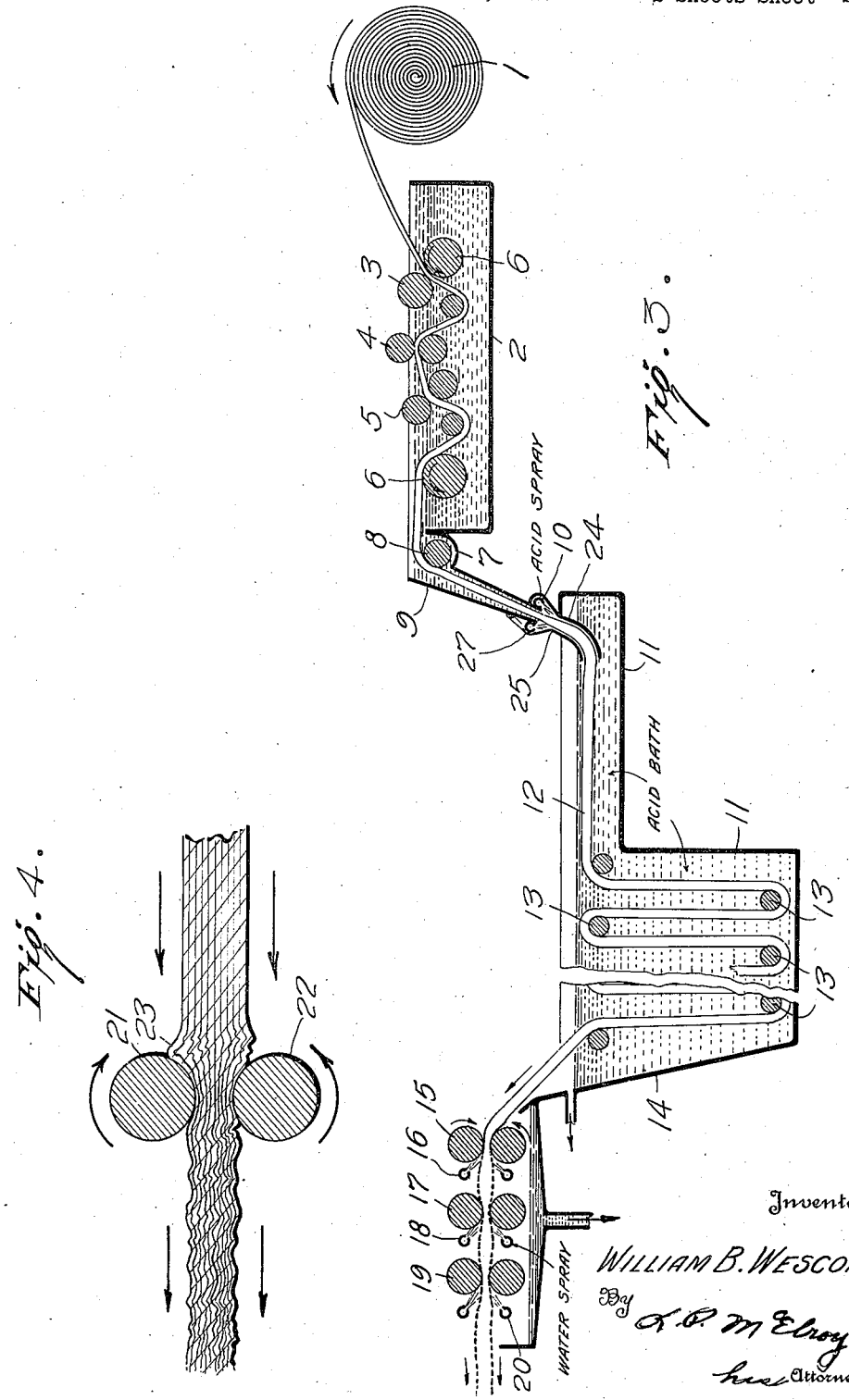

Patented May 28, 1929.

1,714,995

UNITED STATES PATENT OFFICE.

WILLIAM BURTON WESCOTT, OF DOVER, MASSACHUSETTS, ASSIGNOR TO RUBBER LATEX RESEARCH CORPORATION, OF BOSTON, MASSACHUSETTS, A CORPORATION OF MASSACHUSETTS.

TREAD STOCK.

Application filed October 28, 1925. Serial No. 65,439.

This invention relates to tread stock; and it comprises a sheeted material mainly intended for shoe soles or other surfaces subjected to abrasive wear, said material consisting mainly of rubber or rubber compound, with a minor amount of fiber or fiber aggregations distributed throughout the rubber, this fiber being in such arrangement as to limit the extensibility of the material, in at least one direction, while giving it a limited extensibility in another direction, such extensibility being, initially, that of the rubber but being sharply arrested at a given point while the flexibility of the article is that of the rubber but slightly limited beyond a certain point; all as more fully hereinafter set forth and as claimed.

An ideal shoe sole is resilient and is flexible in a longitudinal direction but resists spreading or extension transversely and for some purposes is advantageously less flexible transversely than longitudinally, conforming to the natural movements of the foot as well as preventing deformation of the shoe. It should furthermore be waterproof, be permanently non-slipping and be adapted to the usual shoe making processes, i. e. easily skived, channeled and stitched, firmly retaining the stitch, and be of a strong durable nature. None of the materials now in use meets all of these requirements in full measure. Leather is not resilient and if dense enough to prevent deformation of the shoe is relatively inflexible and furthermore it cannot, as a shoe sole, be made permanently waterproof. The currently used rubber soles and the recently introduced crude rubber "plantation crepe" soles while resilient and waterproof do not hold stitches, spread badly and are rather more slippery when wet than is leather.

It is the object of the present invention to provide a material meeting more nearly the stated requirements. To this end I make a sheeted material composed mainly of rubber or rubber compound but containing, distributed fiber or thread in less amount; this distributed fiber being so contained as to give a reinforcing action in all directions and to appear, in part, at the wearing surface, thus increasing the surface coefficient of friction and producing a substantially non-slip surface; these characteristics persisting as the sole is worn down through the body of rubber and fiber. The fiber of the sole is, in part, and in a transverse direction at least, put under tension by any deformation, thus limiting the extensibility but is so arranged that the longitudinal flexibility at least is substantially that of the rubber compound up to a certain point. I find by experience that it is necessary for a composite article, containing both rubber and fiber distributed therethrough of such substantial length as to give reinforcement and limit extensibility, to carry more than 50 per cent rubber or rubber compound in order that it may evince the usual rubber properties sufficiently for use as tread stock. Using long fiber and less amounts of rubber the material amounts to cemented fiber rather than reinforced rubber. If the natural interstitial voids of compacted fiber be just filled with rubber the slightest flexing or extension puts the fibers under tension and the reaction of the cemented fiber mass has substantially none of the usual rubber properties. If on the other hand the fibers are isolated and spaced apart by a relatively large amount of rubber, then the first reaction to an applied force, is substantially that normal to rubber, but as the reinforced rubber is compressed, flexed and extended the fibers come into play and the usual rubber characteristics are more or less greatly curtailed. With less than 50 per cent rubber the cemented fibers form a stiff hard mass, comparable to that obtainable with any slightly flexible bond such as polymerized China wood (tung) oil or even the harder bonds such as obtained with phenol condensation products, such as bakelite and the like. It is merely cemented fiber. From 50 per cent of rubber upward the physical characteristics change very rapidly. Actually about 65 per cent rubber is a practical working minimum. For tread purposes the rubber is best but slightly vulcanized and is often advantageously used raw, that is uncured.

Raw rubber exists in two forms: one produced by coagulation of latex as by acetic acid or other convenient chemical coagulant, and the other "gelled rubber" obtained by simply drying the latex. Either may be here used, or latex itself may be directly employed. Rubber may be used with or without the addition of suitable "fillers", or as the basis for a rubber compound produced in the usual ways.

In the present invention I secure an intimate and uniform distribution of fiber through rubber by the direct use of latex itself as a source of rubber. For the present purposes, latex may be defined as the milky juice of Hevea. It ordinarily carries around 30 per cent of rubber, together with various other solid bodies, resins, proteids, enzymes, etc. As stated, the presence of more than 50 per cent of rubber in the material is required to give it the ordinary rubber properties. Fibers and fabrics will hold by simple capillarity from 100 per cent to 200 per cent of latex, giving with a 30 per cent latex and on a dry basis a final material carrying 23 per cent to 37 per cent of rubber; or an amount materially less than is deemed necessary for the present purposes.

More latex, however, and sufficient for the present purposes, can be incorporated with fiber by various methods, for example, by producing an open-textured material capable of holding liquid latex in void spaces as well as in capillary spaces, and adding latex in such a way as to avoid collapse. A specially prepared open-textured sheet or bat may be simply placed in a shallow pan and the pan filled with the right amount of latex; this latex being then either gelled on the fiber by evaporation or coagulated by addition of a little acid. This gives a flat body or sheet of rubber of less dimensions and containing distributed fiber in any proportions desired.

This method, or that hereinafter described, produces a porous sheet of rubber and fiber, which should be carefully dried at a low temperature, best with the use of a high vacuum, to a point where the water contained is less than that normal to the contained fiber under atmospheric conditions. The drier the fiber can be made the better. On now compressing, as by rolling, the open textured sheet, the rubber surfaces weld together and a compact sheet is obtained.

The heavy pressure of the compressing rolls tends to put most of the fibers, both laterally and longitudinally, in a position to come by tension under an applied force, and there results a mass having a very limited flexibility and substantially no extensibility, but as the amount of rubber is ordinarily kept at about 75 per cent the article has, though slightly diminished, the characteristic resiliency of rubber.

In the present invention it is desired to give limited longitudinal flexibility without however diminishing the desirable lateral nonextensibility, and the final rolling is performed between rolls of different peripheral speeds. In so doing the material banks up more or less resulting in a peculiar transverse structure from a foreshortening and corresponding thickening of the sheet; which is in effect a sort of pleating. Superficially the article appears as if transversely corrugated; but the "corrugations" represent a peculiar structure extending through the sheet by which the contained fibers are in different relationships to the rubber body across and along the sheet. At these points the fibers are relieved of any longitudinal tension which they may have and are, so to speak, rolled up or crumpled a little. Without interfering with the transverse inextensibility, a freer longitudinal flexibility and extensibility are given. On longitudinal extension the sheet yields at first as freely as rubber sheet without reinforcement, but as the fibers come under tension there is an abrupt limit to the extension. Laterally this yielding does not occur.

Because of the presence of the included fiber, most of which is in uniform distribution throughout the body of the material the sheet is readily stitched and the stitches are firmly held by the surrounding fibers under tension. The included fiber also produces a high surface coefficient of friction and where the fiber is in substantially uniform distribution a shoe sole or tread never wears smooth enough to become slippery. In cutting or punching shoe sole shapes from a sheet of this material the long axis of the sole is so laid as to yield a sole flexible lengthwise but not extensible crosswise.

Tread stock made under the present invention with the aid of latex as an initial material may be, and advantageously is, unvulcanized or uncured. This is for the reason that raw rubber, either coagulation rubber or gelled rubber, has physical properties advantageous in a shoe sole. However, in using latex, if cured final products are desired they may be secured by the simple expedient of incorporating flowers of sulfur in the fibers prior to impregnation; or by simply adding sulfur to the fluid latex and maintaining the suspension by stirring, the rest of the process being as previously described. After the final formation of a sheet of tread stock it may be cured in the ordinary ways; either before or after cutting.

In the accompanying illustration I have shown more or less diagrammatically various matters susceptible of illustration in connection with the present invention. In this showing, Figure 1 is a view of a complete sole having the structure hereinbefore called "creped" and made by the preferred mode hereinbefore stated;

Fig. 3 is a mechanical view showing apparatus which may be employed for making an inflated body of latex carrying fiber; this view being in longitudinal section with certain parts in elevation; and Fig. 4 is a detailed fragmentary view showing a dried, expanded rubber sheet containing fiber going between rolls giving a chatter.

Figure 1:
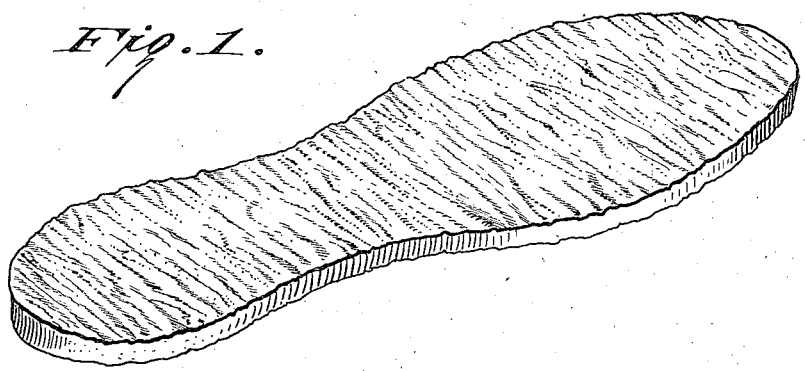

Referring first to Figure 3, felt or batted fiber which may be stitched or knitted to some extent in order to maintain its lofty structure is fed from roll 1 through a bath of latex in tank 2, various pairs of rolls, 3, 4 and 5 being provided to assist in impregnation. Idler rolls 6 guide the sheet in a circuitous path through the bath. Dam 7 is just below the upper liquid level of the latex. Beyond it is another idler 8 and a chute 9 extending downward to a lower level. Latex overflows into this chute and is there under some hydrostatic head. Passing downward through the chute the bat is exposed to an acid spray from spray means 10 which skin coats it, forming a sealing film. The excess acid outside the sheet flows downward and prevents adhesion of the rubber to the metal members of the chute. Beyond the lower level of the chute the traveling sheet enters acid bath 11. In this bath the skin coated bat 12 tends to float but is carried forward by rollers 13 which cause it to pass through well 14 of the acid bath as festoons. Its period of travel through the well is sufficient to produce complete internal coagulation of the contained latex. The sheet which is now interiorly a spongy textured or honeycomb-like structure of fiber, rubber, and included watery liquid, passes upward out of the acid bath between squeezing rolls 15 which rupture the outer coating and express the contained watery liquid. Upon re-expansion beyond these squeeze rolls, the sheet takes up water from spray members 16. The sheet is then compressed by rolls 17, re-wet by sprays 18, recompressed by rolls 19 sprayed from 20, and so on; squeezing and wetting being repeated as many times as to be deemed necessary for washing.

Figure 2:
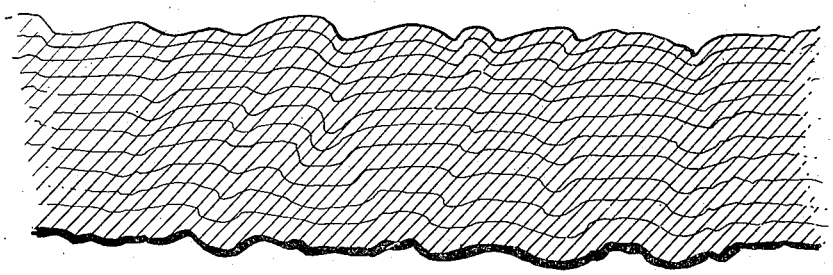
Fig. 2 is an enlarged fragmentary view showing the internal structure corresponding to the creped appearance, the crumpling of internal fibers.

After leaving the last pair of squeeze rolls, the moist sheet is dried in any convenient manner at a low temperature to get rid of water. I find it best to dry under vacuum at a temperature not exceeding 170° F. After drying, the warm spongy mass is compressed in any suitable way, as by a platen press or by rolls, causing the dried raw rubber surfaces to weld together. In Fig. 4 I have shown the effect of producing this welding between rolls 21 and 22 having a certain amount of chatter. As will be noted, the material banks up periodically more or less as indicated at 23, this causing the internal structure shown in Fig. 2 as well as the creped surface.

In the structure of Figure 3, it is of advantage to provide means for varying the width of chute 9 at its lower end to accommodate material of different thicknesses. While it is not essential it is desirable that immediately upon the formation of the surface skin coating or film the material shall be subjected to sufficient rubbing to pack the reticulate structure of the film. For this reason I ordinarily make the lower end of the chute variable. This may be conveniently done by making the portion below the acid sprays 10 of adjustable plates of metal 24 and 25. Aluminum plates 3 or 4 inches long are suitable. The under part 24 may be, as shown, fixed and the upper part 25 hinged to allow it to be swung or moved. Hinging means are shown at 27.

In the accompanying claims where I speak of rubber I mean to include rubber or rubber material from any sources. The rubber may be wholly new rubber, as in using plantation sheet or latex or it may be in part reclaimed rubber from any source. Rubber surrogates such as boiled oil, gilsonite etc. may form part of the material used. Likewise, the rubber may contain various fillers, and woven fabrics may be included in the finished product, and the exterior corrugated appearance of the sheet may be retained or removed.

What I claim is:—

1. As a new tread stock, sheeted material composed of rubber with a minor amount of relatively long fiber distributed therethrough in such manner as to reinforce said rubber in all directions, said sheeted material being pleated as a whole to have more extensibility in one direction than in another.

2. As a new tread stock, sheeted material consisting mainly of rubber containing a minor amount of distributed fiber, such fiber being in such arrangement as to limit extensibility in one direction while permitting maximum flexure in another direction at right angles thereto, the fiber being specifically crumpled in the direction of flexibility.

3. A tread stock consisting of rubber containing distributed fiber in random arrangement and in amount less than the amount of rubber, said sheet being pleated in one direction to place the fiber under tension in one direction and not under tension in another direction at right angles thereto.

4. A sheet of rubber composition containing distributed long fiber therein, said fiber in random arrangement and being specifically crumpled in one direction of a sheet and not crumpled in a direction transverse thereto.

5. A sheet of rubber composition containing distributed long fiber therein, said fiber in random arrangement and being specially crumpled in one direction of a sheet and not crumpled in a direction transverse thereto, said fiber being less than 50 per cent of the whole mass.

In testimony whereof, I have hereunto affixed my signature.

WILLIAM BURTON WESCOTT.